Figure 1:
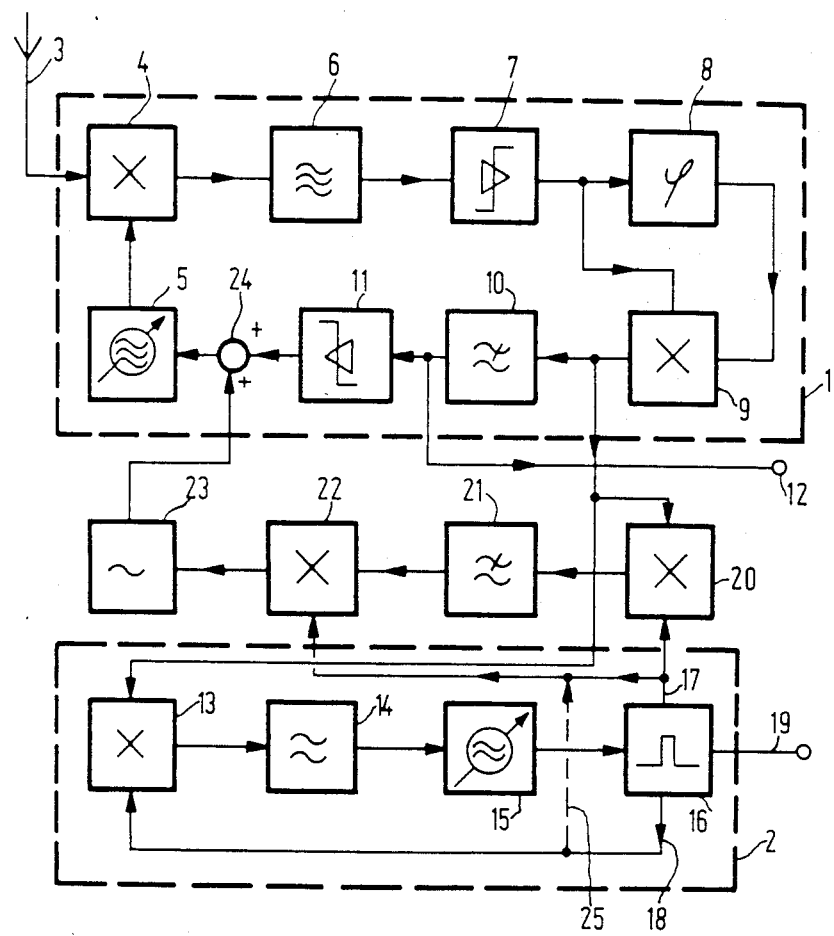

United States Patent [19]

Jansen et al.

[11] Patent Number: 4,669,119
[45] Date of Patent: May 26, 1987

[54] FM STEREO RECEIVER

[75] Inventors: Winfrid B. Jansen, Ellerbek; Wolfgang Nolde, Hamburg, both of Fed. Rep. of Germany

[73] Assignee: U.S. Philips Corporation, New York, N.Y.

[21] Appl. No.: 809,537

[22] Filed: Dec. 16, 1985

[30] Foreign Application Priority Data

Dec. 18, 1984 [DE] Fed. Rep. of Germany ....... 3446078

[51] Int. Cl.$^4$ ............................................. H04H 5/00
[52] U.S. Cl. ..................................... 381/13; 455/208
[58] Field of Search ..................... 381/2, 3, 4, 13, 12; 455/208, 260

[56] References Cited

U.S. PATENT DOCUMENTS

| | | | |
|---|---|---|---|
| 3,270,138 | 8/1966 | Golonski | 381/13 |
| 4,076,963 | 2/1978 | Fujie et al. | 381/4 |
| 4,092,602 | 5/1978 | Nishioka et al. | 381/3 |
| 4,195,203 | 3/1980 | Sakai et al. | 381/13 |
| 4,249,038 | 2/1981 | Stienstra | 381/4 |
| 4,300,019 | 11/1981 | Toyomaki | 381/3 |
| 4,300,020 | 11/1981 | Toyomaki | 381/4 |
| 4,306,112 | 12/1981 | Ueno | 381/13 |
| 4,502,148 | 2/1985 | Ishida et al. | 381/13 |
| 4,523,328 | 6/1985 | Kasperkovitz | 381/3 |

Primary Examiner—Forester W. Isen
Attorney, Agent, or Firm—Thomas A. Briody; William J. Streeter; Marianne R. Rich

[57] ABSTRACT

An FM stereo receiver has a loop having a negative loop gain for the pilot signal contained in the input signal in the form of a frequency modulation. As a result thereof the frequency modulation of the input signal is reduced or suppressed by the pilot signal, so that the interference introduced by this pilot signal is also reduced or suppressed.

4 Claims, 2 Drawing Figures

FM STEREO RECEIVER

The invention relates to an FM stereo receiver including a mixer stage for mixing an input signal with the signal of a first controllable oscillator, an FM demodulator for demodulating the output signal of the mixer stage and a circuit for processing the pilot signal contained in the input signal.

Generally, receivers of such a type have an intermediate frequency of 10.7 MHz. There are, however, also FM receivers having a very low intermediate frequency (for example 80 kHz), which is in the order of magnitude of the frequency of the pilot signal. An advantage of a receiver having such a low intermediate frequency is that it is possible to realize the overall receiver to a very large extent by one single integrated circuit. The low intermediate frequency has, however, the disadvantage that interferences in the reception occur when such a circuit is implemented as a stereo receiver and stereo signals are to be received thereby.

The present invention has for its object to provide a circuit arrangement of the type defined in the opening paragraph having such a structure that such interferences in the reception are suppressed to a very large extent, also when a low intermediate frequency is used.

According to the invention, this object is accomplished in that the pilot signal is applied to the control input of the first oscillator such that the mixer stage, the FM demodulator, the circuit for processing the pilot signal and the first oscillator form a loop having a negative loop gain for the frequency of the pilot signal.

Investigations which resulted in the invention, have shown, that at the output of an FM receiver of the type defined in the opening paragraph, noise components occur whose spacing from the intermediate frequency and also from twice the intermediate frequency corresponds to an integral multiple of the pilot signal frequency, the amplitude of the noise component being lower according as the abovementioned frequency spacing is larger. With FM stereo receivers having a higher intermediate frequency these components are located very far outside the useful low frequency signal range and consequently do not interfere. In contradistinction thereto, with intermediate frequencies of, for example, 80 kHz these side bands extend into the useful signal range, that is to say into the range of the differential signal modulated on the sub-carrier (38 kHz). In this case the noise components are noticeable in an annoying manner during reproduction.

According to the invention, these noise components are now reduced because of the fact that a loop having a negative loop gain for the frequency of the pilot signal is formed. As a result thereof the oscillator produces an output signal which—as also the input signal applied to the mixer stage—is frequency-modulated by the pilot signal. For a negative loop gain the frequency modulation comprised in the input signal and originating from the pilot signal is partially compensated for by the frequency modulation contained in the oscillator output signal, thus significantly reducing the interferences.

The invention is not only suitable for use with FM stereo receivers having a low intermediate frequency, but basically with all types of FM receivers in which the pilot signal produces interference.

DE-PS No. 20 52 098, for example, discloses a noise canceller circuit in which the signal path incorporates a noise detector-controllable switch which is opened in the event of an interference, the instantaneous value of the signal immediately prior to the interference being stored in a capacitor coupled to the switch. When such a noise canceller circuit is used, the pilot signal produces the same interferences which, in the prior art circuit is eliminated, by means of a parallel resonant circuit. When the measure according to the invention is used such a parallel resonant circuit is superfluous.

DE-OS No. 27 39 668 discloses a receiver in which the reception is disturbed by the pilot signal and which consequently comprises a circuit for filtering or compensating for, respectively the pilot signal. Also this compensation or filter circuit is not required when, in accordance with the invention, the pilot signal is already reduced before the FM demodulator.

Figure 2:
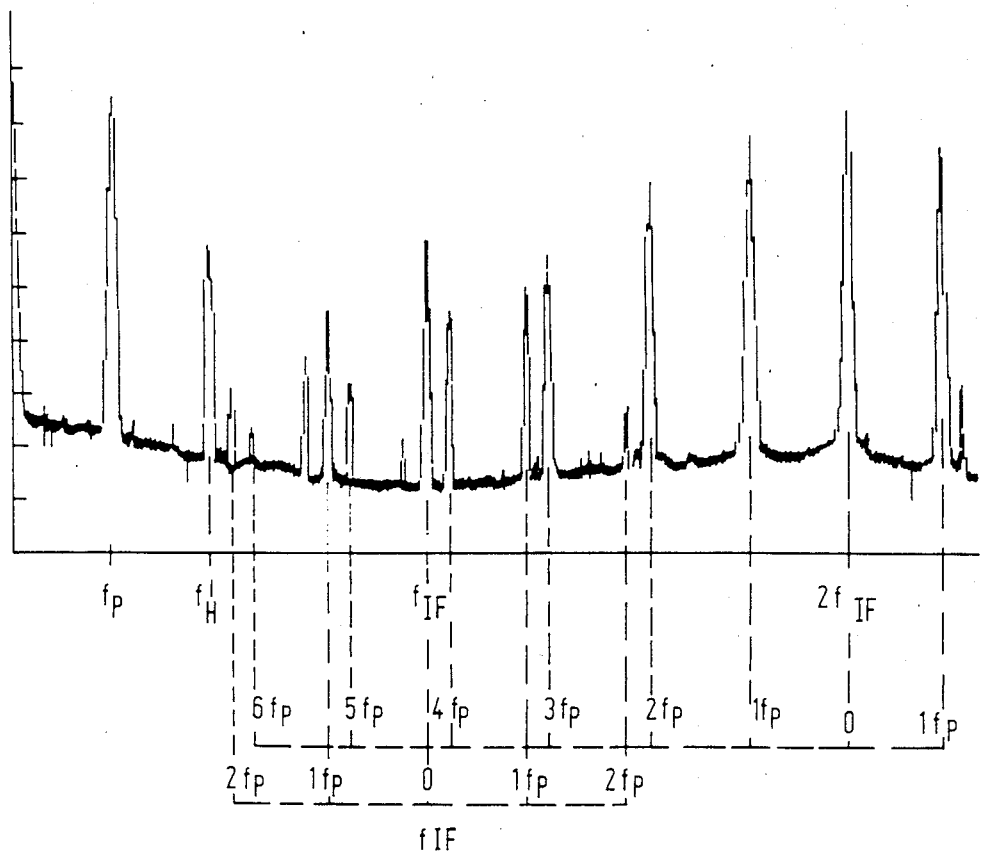

The invention will now be described in greater detail by way of example with reference to the accompanying drawing, in which:

FIG. 1 shows a block circuit diagram of a receiver according to the invention and FIG. 2 shows the frequency spectrum which would be produced in such a receiver when the measures according to the invention were not applied.

FIG. 1 shows the essential portion of an FM-stereo receiver comprising a receiver section 1, a circuit 2 for recovering the pilot signal and a circuit portion for reducing the pilot signal in the received signal. The receiving section 1 is known per se, for example from the publication Technischen Information TI 840217 "Die integrierte Empfängerschaltung TDA 7000", published by Messrs. Valvo. In this disclosure an input signal is applied from an aerial 3 to a mixer stage 4 and mixed therein with the output signal of a first oscillator 5 having an electronically controllable frequency. The output signal of the mixer stage 4 is applied via a IF-amplifier 6 to a limiting amplifier 7 which, in a wide input voltage range, produces a constantamplitude IF-voltage and suppresses to a very large extent any noise amplitude-modulation contained in the IF signal. The output signal of the limiting amplifier is demodulated in a FM-demodulator which is constituted by a quadrature demodulator, and comprises a frequency-dependent phase shifter 8 and a multiplier stage 9. The output signal of the limiting amplifier is applied on the one hand directly and on the other hand via the frequency-dependent phase shifter 8 to the multiplier stage 9, which phase shifter is of such a structure that it produces a 90° phase shift at the intermediate frequency of, for example, 80 kHz. The output signal of the mixer stage is applied to the control output of the first oscillator 5 via a low-pass filter 10 having a cut off frequency of only a few kHz and a further limiting amplifier 11.

The components 4 to 11 form a loop which has a negative loop gain of the order of magnitude of 4 or 5 in a frequency range which depends a.o. on the upper cut-off frequency of the low-pass. Consequently, a dynamic negative feedback is obtained which is compressed by the frequency swing of the input signal, so that the low intermediate frequency of 80 kHz does not result in folding of the frequency spectrum and on the other hand a static negative feedback is effected, in response to which the average oscillator frequency is controlled to such a value that the temporal mean value of the frequency of the output signal of the mixer stage 4 corresponds to that frequency at which a phase shift of approximately 90° is produced by the phase shifter 8. The low frequency output signal is taken from the output of the low-pass filter 10 and applied to an output terminal 12.

The output signal of a multiplier stage 9 which constitutes part of the FM quadrature demodulator is applied to the input of the circuit 2 for processing the first pilot signal; it is fundamentally however possible to use the output signal of the low-pass filter 10 for this purpose. The circuit 2 includes a mixer or a multiplier stage 13, respectively, in which the output signal of stage 9 is mixed with a 19 kHz square-wave signal. A low-pass filter 14 arranged subsequent to the mixer stage 13 suppresses the products resulting from the mixing or multiplying procedure on the sum frequency and only products having a differential frequency are passed through, which are applied to the control input of a second electronically frequency-controllable oscillator 15, which produces an output signal having a frequency of 76 kHz. The frequency of this output signal is divided and shaped in a circuit 16. The circuit 16 produces at a first output 17 a first 19 kHz square-wave signal (third pilot signal), at a second output 18 a second 19 kHz square-wave signal phase-shifted through 90°, and at a third output 19 and 38 kHz signal whose positive edges coincide with the zero crossings of the 19 kHz square-wave signal at the first output 17, and is used for decoding the stereo signal. The second 19 kHz signal at the output 18 is applied to a second input of the mixer stage 13 and, as described in the foregoing, is mixed therein with the output signal of the multiplier circuit 9. As the low-pass filter 14 subsequent to the mixer stage 13 is dimensioned such that only differential products are allowed to pass which are obtained from mixing the 19 kHz signal and the pilot signal contained in the output signal of the multiplier stage 9, the output signal of the oscillator 15 only depends on the phase difference between the pilot signal and the signal at the output 18. In the steady state it adjusts itself such that a phase difference of accurately 90° consists between the said two signals, the output signal of the low-pass filter 14 being zero.

Processing the differential signal modulated on the sub-carrier is not shown in greater detail in the drawing. This operation may be effected in the manner described in EP-OS No. 00 88 467.

FIG. 2 shows the frequency spectrum which would be obtained at output 12 when the aerial input signal were only modulated with the pilot signal, and the circuit according to the invention still further to be described were not available. A series of noise components are shown. A more accurate analysis shows that there is a first group of noise components whose frequency spacing from twice the value of the intermediate frequency $f_{IF}$ corresponds to an integral multiple of the frequency $f_p$ of the pilot signal. This group of interferences is basically determined by the quadrature demodulator. In addition, there is a second group of noise components whose frequency spacing from the intermediate frequency $f_{IF}$ always corresponds to an integral multiple of the frequency $f_p$ of the pilot signal and are determined by the finite IF-suppression of the IF-demoulator.

As will be obvious from the diagram, the noise components extend into the frequency range around the subcarrier $f_H$, in which the side bands of what is commonly referred to as the differential signal are located. During decoding of the stereo signal some of these components become consequently audible in an annoying manner. These components are suppressed, at least partially, by the measures according to the invention.

The circuit for supressing the noise components includes a multiplier stage 20, which may be of the same structure as the stages 4, 9 and 13. One input of the multiplier stage 20 is connected to the output 17 of the circuit 16 and the other input to the output of the FM-demodulator 8, 9. The last-mentioned output is also connected to the input of the PLL-circuit 2.

The input signals applied to the two inputs of the multiplier stage 20 consequently have either the same or the opposite phase, so that the output signal of this stage containe a d.c. component and an a.c. component of twice the frequency of the pilot signal, which is suppressed by means of a low-pass filter 21.

The low-pass filter 21 connects the output of the multiplier stage 20 to an input of a further multiplier stage 22. Therefore, the d.c. component which is produced by the stage 20 and is proportional to the amplitude of the pilot signal at the output of the FM demodulator 8, 9 (first pilot signal) is present at this input. The other input of the further multiplier stage 22 is connected to the output 17 of the circuit 16, at which output there is a 19 kHz signal (third pilot signal) which has the same phase as the pilot signal at the output of the FM demodulator 8, 9. Consequently, a 19 kHz signal whose amplitude is proportional to the d.c. component at the output of the low-pass filter 21, i.e. the amplitude of the pilot signal at the output of the FM demodulator 8,9 appears at the output of the multiplier stage 22.

This 19 kHz square-wave signal is converted by a stage 23 into substantially sinusoidal signal with the same frequency and phase. This stage 23 which may alternatively be included in the connecting line between the multiplier stage 22 and the output 17, may, for example, contain appropriate filters which suppress the harmonics of the square-wave signal. The stage 23 may be omitted when the 19 kHz signal is produced by a circuit which synthesizes a substantially sinusoidal oscillation from several triangular signals, in the manner disclosed in the DE-OS No. 33 11 072. Fundamental for all these cases is only that a 19 kHz signal is available which is to a large extent free from harmonics and whose amplitude is proportional to the amplitude of the pilot signal at the output of the FM demodulator and that there is a fixed phase relationship between these two signals.

The output signal of the stage 23 is superposed in an adder stage 24 on the output signal of the limiting amplifier 11 and the resultant sum signal (second pilot signal) is applied to the control input of the first frequency-controllable oscillator 5. When the signal applied to the adder stage 24 has such a phase position that a loop having a negative loop gain is obtained—is this case the output signal of the oscillator 5 is frequency-modulated by the 19 kHz signal in the same manner as the aerial signal is modulated by the pilot signal—, then at the output of the mixer stage an intermediate frequency signal is produced, which, compared with the input signal, has a significantly reduced frequency modulation by the pilot signal. As consequently at the input of the FM demodulator 8, 9 a signal is available which is only frequency-modulated to a very small extent by the pilot signal, the noise-components produced thereby at the output 12 are significantly reduced.

The output signals of the PLL-circuit 2 are independent to a very large extent of the amplitude of the pilot signal contained in the aerial signal. If the output signal of this circuit were directly applied to the adder circuit 24, then the loop gain produced in the loop formed by the blocks 4, 6 . . . 9, 2, 24, 5 would not be constant. This undesired effect is avoided by use of the multiplier stage 22, in which the output signal of the circuit 2 is multiplied by a value proportional to the pilot signal amplitude at the output of the FM demodulator, so that the amplitude of the output signal of the multiplier stage 22 is proportional to the amplitude of the pilot signal and the loop gain gain for the pilot signal is constant.

The selective components in the loop, more specifically the intermediate-frequency filter 6, may cause the pilot signal at the output of the FM demodulator to be phase-shifted relative to the pilot signal contained in the aerial input signal in the form of a modulation. This phase shift must then be compensated for again, to ensure that a negative loop gain is obtained. To that end, an appropriate phase-shifting member may be provided in the loop, for example, between the PLL-circuit 2 and the input of the multiplier stage 22. The desired phase shift is however also obtainable by applying to the input of the multiplier stage 22 in addition to the 19 kHz square-wave signal at the output 17 of the circuit 16, a portion of the 19 kHz square-wave signal located at output 18 which is shifted through 90° relative to the 19 kHz square-wave signal, as is illustrated by means of the broken line 25. It can be proved that from the weighted sum of two signals shifted through 90° relative to each other, and which are optionally also inverted, a superposition signal with any desired phase shift can be produced.

The noise components generated by the pilot signal are suppressed to a greater extent as the loop gain increases; with an infinite loop gain these components are fully suppressed. Because of production tolerances different delays occur in individual receivers, which results in a finite loop gain in the relevant receiver, if an individual compensation is not effected. In practice, it is therefore more advantageous to choose a loop gain between 10 and 100, which can easily be adjusted independent of production tolerances and without additional compensation. The noise components are then indeed not fully suppressed, but are at least reduced from 20 to 40 dB, which is sufficient for the majority of cases.

In the foregoing, the invention is described on the basis of a receiver having a low intermediate frequency. The invention is, however, also useful for all cases in which a pilot signal contained as a frequency modulation in the input signal produces interferences, for example in FM receivers in accordance with DBP No. 20 52 098, in which when the measures according to the invention are used the noise canceller circuit can be of a significantly simpler structure.

What is claimed is:

1. An FM stereo receiver including a mixer stage for mixing an input signal containing a first pilot signal having a first frequency with a signal from a first controllable oscillator, an FM demodulator for demodulating the output signal of the mixer stage, and a circuit for processing said first pilot signal to generate a second pilot signal corresponding thereto, characterized in that said second pilot signal is applied to a control input of said first controllable oscillator such that said mixer stage (4), said FM-demodulator said circuit for processing said first pilot signal and said first oscillator from a loop having a negative loop gain at said first frequency.

2. An FM stereo receiver as claimed in claim 1, characterized in that the circuit for processing the first pilot signal incorporates a second controllable oscillator, from whose output signal a third pilot signal is derived which is applied to the control input of the first controllable oscillator via a circuit (22) having a transfer factor which is linearly controlled in dependence on the amplitude of the first pilot signal.

3. An FM stereo receiver as claimed in claim 2, characterized in that the circuit for processing the first pilot signal is connected to the control input of the first controllable oscillator (5) via a circuit (23) for supressing the harmonics.

4. An FM stereo receiver as claimed in claim 2, further comprising means connected to the FM-demodulator for generating a low-frequency output signal, and wherein the low-frequency output signal is also applied to the control input of the first controllable oscillator (5).

* * * * *

UNITED STATES PATENT AND TRADEMARK OFFICE
CERTIFICATE OF CORRECTION

PATENT NO. : 4,669,119
DATED : May 26, 1987
INVENTOR(S) : Winfrid B. Jansen et al It is certified that error appears in the above-identified patent and that said Letters Patent is hereby corrected as shown below:

Claim 1, line 11    change "from" to --form--

Signed and Sealed this

Sixth Day of February, 1990

Attest:

JEFFREY M. SAMUELS

Attesting Officer          Acting Commissioner of Patents and Trademarks